United States Patent [19]

Darrieux

[11] Patent Number: 5,429,853
[45] Date of Patent: Jul. 4, 1995

[54] METHOD FOR PRODUCING A FIBER REINFORCEMENT FOR A COMPONENT OF COMPOSITE MATERIAL, AND COMPOSITE COMPONENT COMPRISING SUCH A REINFORCEMENT

[75] Inventor: Jean-Louis Darrieux, Saint-Medard-en-Jalles, France

[73] Assignee: Societe Nationale Industrielle et Aerospatiale, Paris, France

[21] Appl. No.: 12,457

[22] Filed: Feb. 2, 1993

[30] Foreign Application Priority Data

Feb. 11, 1992 [FR] France ................. 92 01510

[51] Int. Cl.⁶ ................. B32B 7/08; D05B 3/12
[52] U.S. Cl. ................. 428/102; 112/440; 112/470.13; 112/475.01; 156/93; 428/113; 428/119
[58] Field of Search ................. 112/265.1, 440; 428/102, 113, 119; 156/93

[56] References Cited

U.S. PATENT DOCUMENTS

| | | | |
|---|---|---|---|
| 4,256,790 | 3/1981 | Lackman et al. | 428/73 |
| 4,331,495 | 5/1982 | Lackman et al. | 156/93 |
| 4,379,798 | 4/1983 | Palmer et al. | 428/113 |
| 4,512,835 | 4/1985 | Gardiner | 156/174 |
| 4,622,254 | 11/1986 | Nishimura et al. | 428/102 |
| 4,786,541 | 11/1988 | Nishimura et al. | 428/102 |
| 4,863,660 | 9/1989 | Cahuzac et al. | 264/103 |
| 4,917,756 | 4/1990 | Cahuzac | 156/429 |
| 4,992,317 | 2/1991 | Chess et al. | 428/102 |
| 5,019,435 | 5/1991 | Cahuzac et al. | 428/36.1 |
| 5,021,281 | 6/1991 | Bompard et al. | 428/259 |
| 5,095,833 | 5/1992 | Darrieux | 112/2 |

FOREIGN PATENT DOCUMENTS

| | | |
|---|---|---|
| 0056351 | 7/1982 | European Pat. Off. . |
| 0073648 | 3/1983 | European Pat. Off. . |
| 0261375 | 3/1988 | European Pat. Off. . |
| 0284497 | 9/1988 | European Pat. Off. . |
| 0402099 | 12/1990 | European Pat. Off. . |
| 0444971 | 9/1991 | European Pat. Off. . |
| 2658841 | 8/1991 | France . |
| 3147228 | 6/1983 | Germany . |
| WO8002254 | 10/1990 | WIPO . |

*Primary Examiner*—James C. Cannon
*Attorney, Agent, or Firm*—Fisher, Christen & Sabol

[57] ABSTRACT

Method for producing a fibrous reinforcement (1) for a component of composite material comprising a panel provided with a rib. Transverse fibers (4A) are inserted over the whole extent of the first fibrous element (2), through the opposite face of the first fibrous element (2) to the second fibrous element (3) and by the stitching without knotting of a continuous filament (4) by means of a needle (33, 40), so that the transverse fibers (4A), which are located opposite the bearing flange (3A) of the second fibrous element (3), form stitches (4B) joining the first and second fibrous elements together and that some (4A1) of the transverse fibers (4A) are located vertically in line with the stiffening flange (3B) of the second fibrous element (3). Also a method for the production of composite components of the aircraft structural panel type.

20 Claims, 7 Drawing Sheets

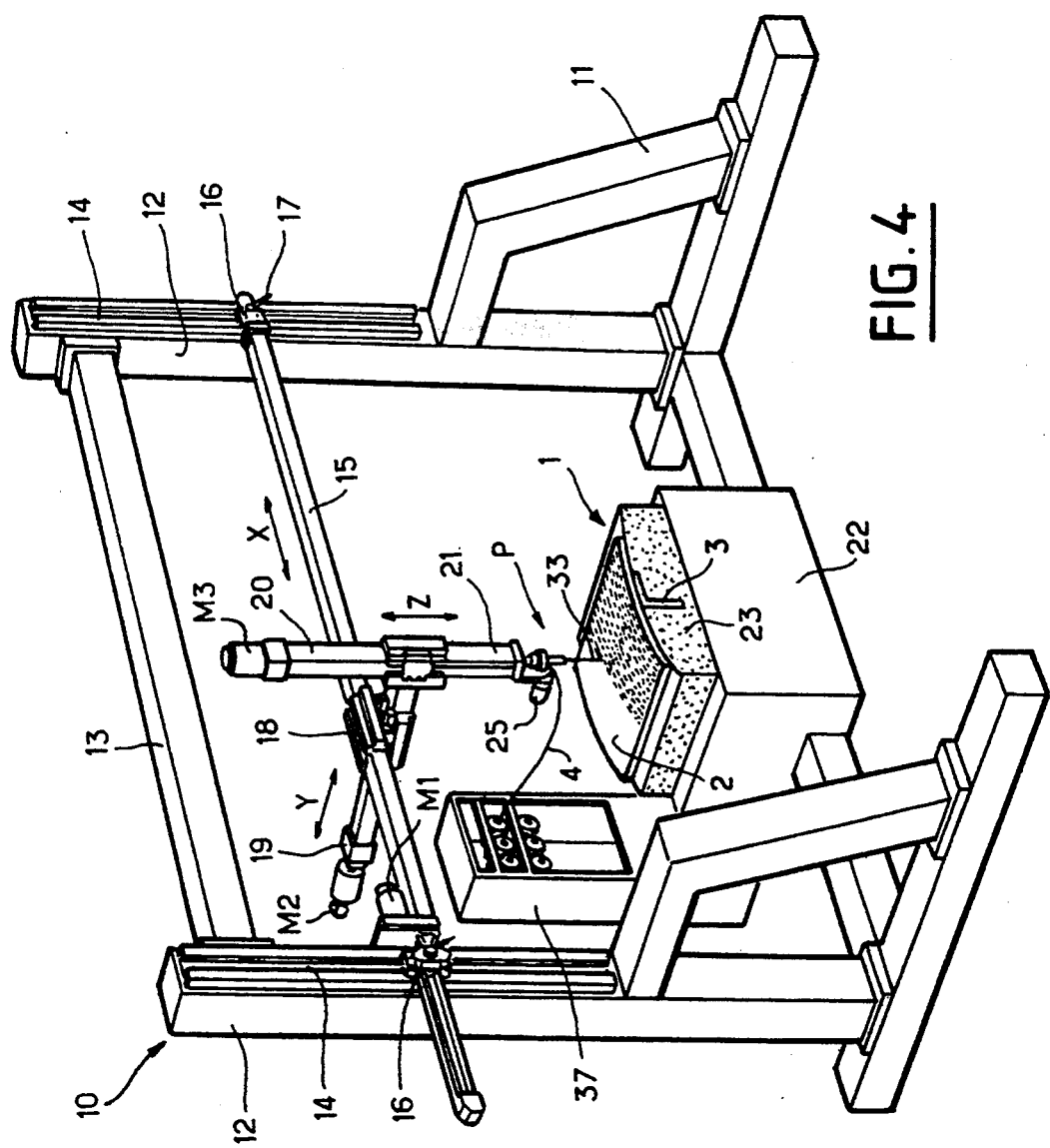

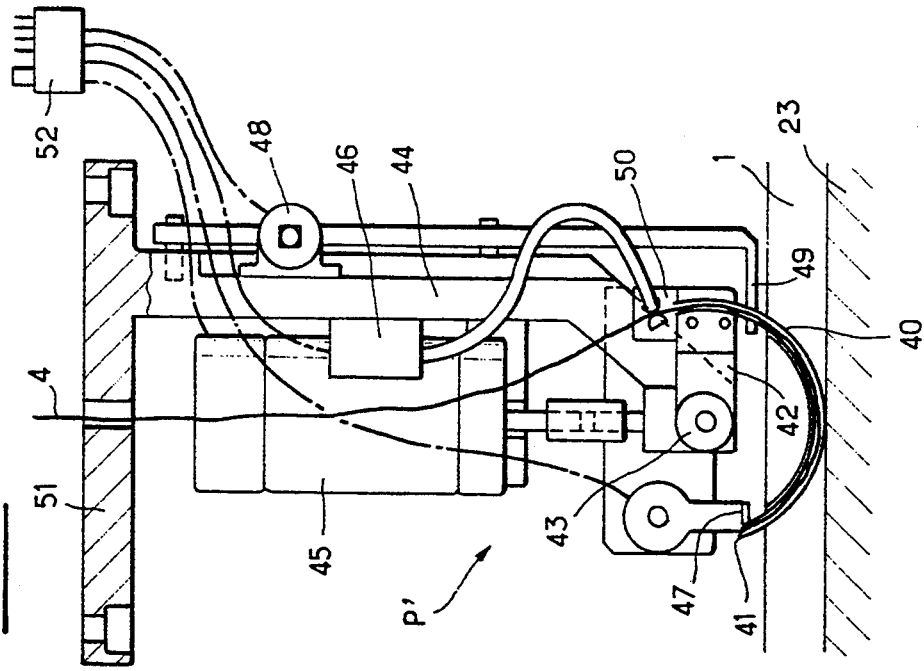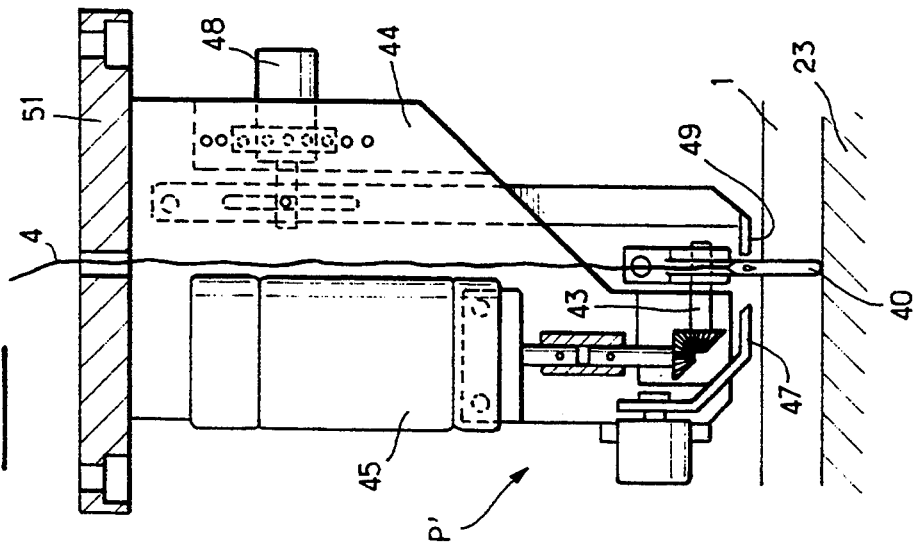

METHOD FOR PRODUCING A FIBER REINFORCEMENT FOR A COMPONENT OF COMPOSITE MATERIAL, AND COMPOSITE COMPONENT COMPRISING SUCH A REINFORCEMENT

BACKGROUND OF THE INVENTION

1. Field of the Invention

The present invention relates to a method for producing reinforcements made of fibers (carbon, glass, boron, etc . . . ) for components of composite material, and to the reinforcements and composite components obtained by the implementation of said method.

2. Background Art

Many methods are known for obtaining such components of composite material, consisting of a fiber reinforcement embedded in a cured matrix. The first step is to produce a reinforcement of such fibers distributed along at least two directions, after which the material of said matrix is injected into said reinforcement and said material is cured in order to form the matrix.

From European Published Patent Application No. 0073648 and German Patent No. 3,147,228, it is already known to produce such a fibrous reinforcement by assembling a plurality of distinct fibrous elements by stitching them together.

However, these known methods do not make it possible to produce, in a satisfactory manner, composite components similar to those made of light metal alloy which are produced as aircraft structural panels and comprise plane or curved panels reinforced by ribs. In what follows, the term "panels" is not limited to plane or slightly convex surfaces; it also designates surfaces which are as convex as shells or domes.

BROAD DESCRIPTION OF THE INVENTION

The object of the present invention is to overcome this disadvantage.

For this purpose, according to the invention, the method for producing a fibrous reinforcement for a component of composite material comprising a panel provided with a rib, according to which method a first fibrous element representing said panel and a second fibrous element, representing said rib and having at least one bearing flange and one stiffening flange which are orthogonal to each other, are produced, said bearing flange of said second fibrous element is applied against said first fibrous element and said first fibrous element and said bearing flange of said second fibrous element are joined together by means of stitches, is noteworthy in that transverse fibers are inserted over the whole extent of said first fibrous element, through the opposite face of said first fibrous element to said second fibrous element and by the stitching without knotting of a continuous filament by means of a needle, so that said transverse fibers, which are located opposite said bearing flange of said second fibrous element, form said stitches joining said first and second fibrous elements together and that some of said transverse fibers are located vertically in line with the stiffening flange of said second fibrous element.

Thus, by virtue of the invention:

a) the transverse fibers for joining said first and second fibrous elements together are part of the transverse fibers of said first fibrous element, so that this joining together does not bring about a change in the characteristics of this first fibrous element. Indeed, if it were envisaged to join the two fibrous elements together by means of transverse fibers especially provided for this purpose, said special transverse fibers could well damage the mechanical properties of at least one of the elements and, in addition, would bring about a change in mass;

b) the transverse fibers cover the entire surface of said first fibrous element, that is to say in the zones of the latter which are outside the bearing flange of said second fibrous element, in those zones which are vertically in line with said bearing flange and even in those zones which are directly vertically in line with the stiffening flange of said second fibrous element. It will be noted in this connection that the prior art represented by European Published Patent Application No. 0073648 with regard to a beam (see more especially FIG. 9) is not capable of infixing transverse fibers vertically in line with said stiffening flange. The result of this is that this prior art is not satisfactory in the production of composite components according to the aircraft structural panel design. However, even though, according to the invention, the entire surface of said first fibrous element is provided with transverse fibers, it goes without saying that the density of the latter is not necessarily uniform over this surface, but can vary depending on the mechanical characteristics desired for the fibrous reinforcement;

c) the insertion of said transverse fibers by the stitching without knotting of a continuous filament may be easily carried out by using the stitching machines described in U.S. Pat. Nos. 4,863,660 and 4,917,756 and French Patent No. 2,658,841.

The stitching operation requires that the travel of the stitching needle is, in said parts of the fibrous elements which overlap, at least equal to the sum of the thicknesses of said elements, while said travel only has to be equal to the thickness of the first element in the portions of the latter which are outside the overlapping parts of said elements. Thus, measures are taken so that more detail in U.S. Pat. Nos. 4,863,660 and 4,197,756 material which is located vertically in line with said needle.

Transverse fibers may possibly furthermore be inserted through the face of said first fibrous element which is on the side where said second fibrous element is located.

After the reinforcement has been produced, the matrix material is injected, in any known manner, into the reinforcement thus obtained and said material is cured while keeping said reinforcement in the desired final shape.

It will be noted that, in order to facilitate the handling of the fibrous elements during the production of the reinforcement, it is possible to preimpregnate these fibrous elements with a flexible and binding material, such as a curable synthetic resin. This preimpregnating material may either be removed before the final matrix is produced, or be used in order to form, by itself or as an additional material, said matrix.

BRIEF DESCRIPTION OF THE DRAWINGS

The figures in the attached drawing will clearly show how the invention can be produced. In these figures, identical references designate similar elements.

FIG. 4 depicts diagrammatically in perspective a machine for producing the reinforcement of FIG. 1.

FIGS. 7 and 8 show an elevation, along two perpendicular directions and in partial cross section, of a variant of the stitching device for the machine of FIG. 4.

BRIEF DESCRIPTION OF THE INVENTION

Figure 1:
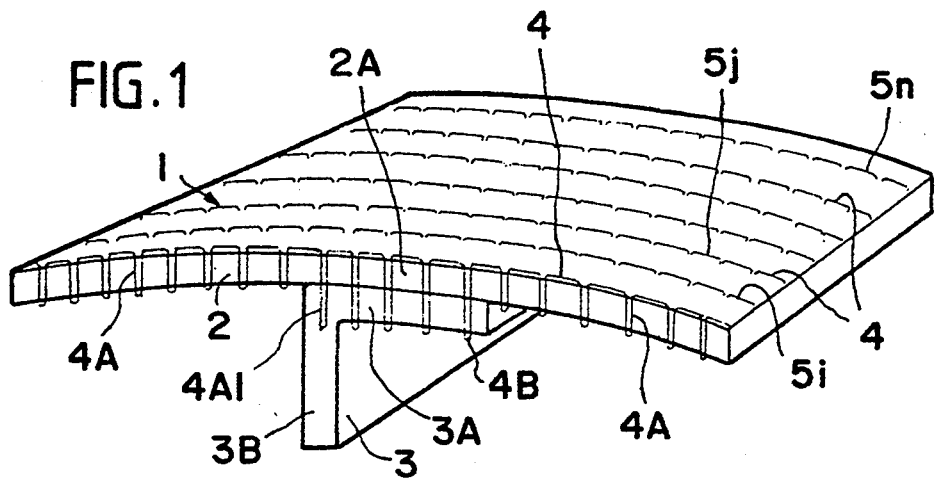
FIG. 1 depicts diagrammatically in perspective a complex fibrous reinforcement in accordance with the present invention comprising two distinct fibrous elements.

The complex reinforcement 1, represented diagrammatically and partially in FIG. 1, comprises two distinct fibrous elements 2 and 3. In the embodiment represented in this figure, the element 2 is in the shape of a curved panel, while the element 3 is in the shape of an angle whose bearing flange 3A is applied against the element 2, the flange 3B of the element 3 being intended to constitute a stiffener for the element 2.

In the distinct elements 2 and 3, the constituent fibers may be arranged in any desired manner according to the characteristics required for the reinforcement 1: for example, the fibers may be arranged in an organized fashion along two or more predetermined directions, or else they may be distributed in a random fashion.

Furthermore, in accordance with the present invention, a continuous filament 4 is inserted by stitching into the distinct element 2 and into the bearing flange 3A of the element 3, from the opposite face of said distinct element 2 to the element 3. This continuous filament 4, on the one hand, supplies the element 2 with transverse fibers 4A, and, on the other hand, joins the distinct elements 2 and 3 together, since it joins the flange 3A of the element 3 to the element 2. It will be noted that some of these transverse fibers 4A, designated by the reference 4A1, are located vertically in line with the stiffening flange 3B. The stitches 4B, which form the transverse fibers 4A and the depth of which is adapted to the thickness of fibrous material (it goes without saying that the thickness of fibrous material to be stitched is greater vertically in line with the bearing flange 3A than in the remainder of the element 2), may be arranged in parallel rows $5i, 5j, \ldots, 5n$. It can be seen in FIG. 1 that said stitches 4B cover the whole extent of the element 2, without leaving any zone of the latter clear.

Depending on the mechanical characteristics desired for the reinforcement 1, the density of the stitches 4B (and therefore of the transverse fibers 4A) may be uniform over the whole extent of the element 2, including in that part 2A of the element 2 which is superimposed on the bearing flange 3A (as is represented in FIG. 1), or else may be modulated in any required fashion, so that some parts of said element 2 have a density of fibers 4A which is greater or less than other parts. In both cases, it is noted that the density of the transverse fibers 4A can correspond exactly to the density required to provide the mechanical properties desired for the element 2 and/or the bearing flange 3A.

In the example of FIG. 1, the stitches 4B are perpendicular to the element 2 and to the bearing flange 3A, so that the transverse fibers 4A are themselves perpendicular to said element 2 and to the bearing flange 3A. On the other hand, in FIG. 2, an embodiment has been represented in which the stitches 4B, and therefore the transverse fibers 4A, are oblique with respect to the thickness of the element 2 and of the bearing flange 3A. Furthermore, the stitches 4B of a row of stitching $5i$ are inclined in one direction, while the stitches 4B of the next row of stitching $5j$ are inclined in the opposite direction, so that, as is represented diagrammatically in FIG. 3, the oblique transverse fibers 4A in two consecutive rows of stitching intersect. Once again, inclined fibers 4A1 are located vertically in line with the stiffening flange 3B of the element 3.

Figure 2:
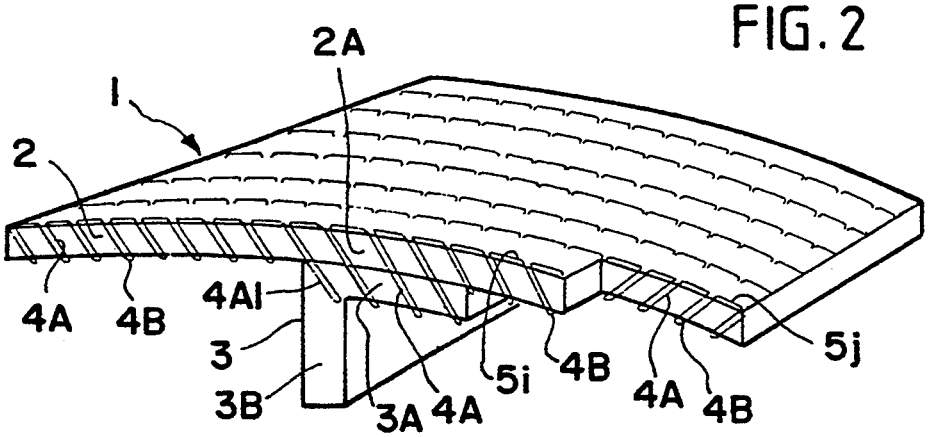
FIGS. 2 and 3 depict diagrammatically a first variant of the reinforcement of FIG. 1.
Figure 3:
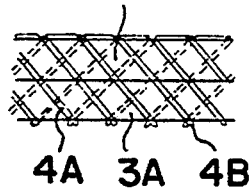

In order to produce the reinforcements 1 shown in FIGS. 1 to 3, it is possible to use the machine 10 which does not require the knotting of the filament 4 and is depicted diagrammatically in FIG. 4 and described in more detail in American U.S. Pat. No. 4,863,660 and U.S. Pat. No. 4,917,756.

This machine 10 comprises a frame provided with an underframe 11 and with vertical uprights 12, joined at their upper part by a horizontal crosspiece 13.

Each vertical upright 12 comprises a slideway 14 and a transverse bar 15 which is fixed near its ends in slides 16 mounted in the slideways 14 in which they can be immobilized by screws 17. By virtue of this arrangement, it is possible to adjust the height of the bar 15 on the uprights 12.

A carriage 18 is mounted on the bar 15 and carries a horizontal arm 19 sliding transversely and in an adjustable manner with respect to the bar 15.

At one of its ends, the horizontal arm 19 carries a vertical arm 20 which is also mounted in a sliding and adjustable manner.

Figure 5:
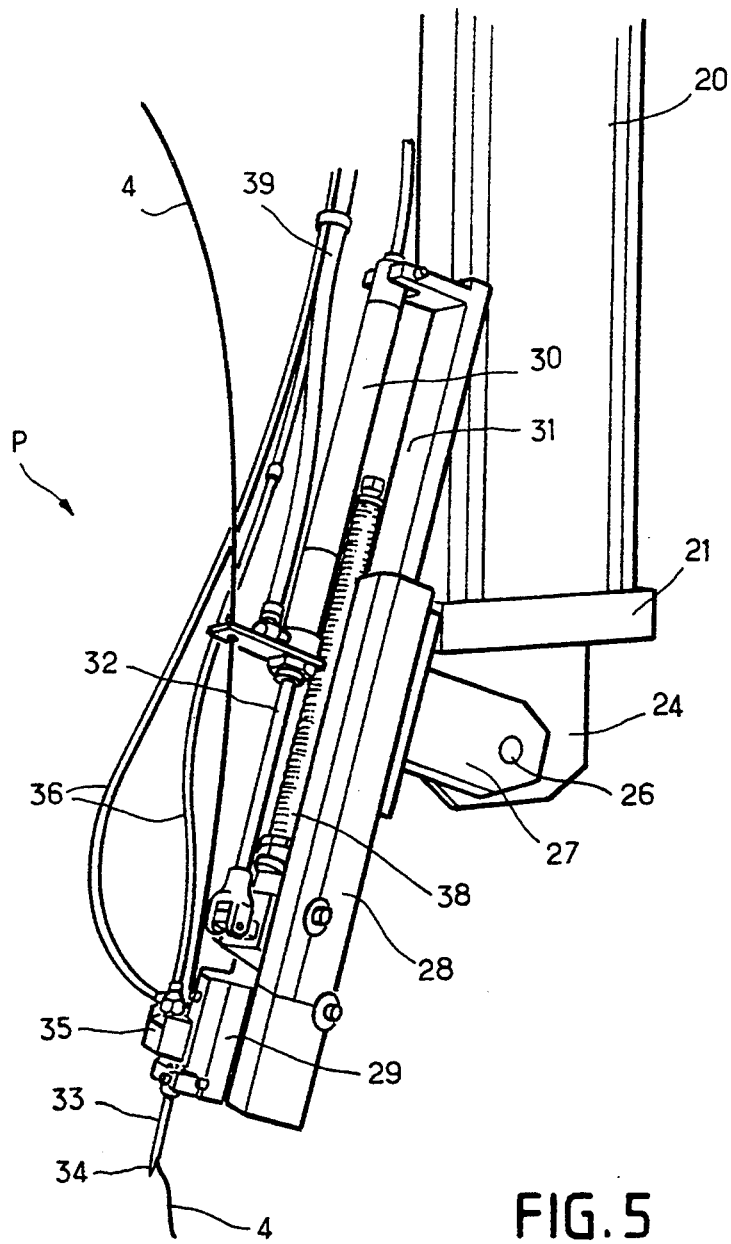
FIG. 5 shows diagrammatically in perspective a stitching device for the machine of FIG. 4.

At its lower end 21, the vertical arm 20 comprises fixing means adapted to receive a stitching device P, which is more clearly visible in FIG. 5.

The machine furthermore includes a base 22, supporting a foam block 23 in which the element 3 is housed and on which the element 2 rests, so that the flange 3A bears against said element 2.

It is understood that, by virtue of the arrangement of the bar 15 and of the arms 19 and 20, the end 21 may be adjusted to any desired position with respect to the foam block 23, along three orthogonal axes X, Y and Z, by means of motors M1, M2 and M3 which are represented, by way of example, mounted on the bar 15 and at the ends of the arms 19 and 20 and drive the latter along these three axes via suitable known systems with a rack and pinion, worm or the like.

As FIG. 5 shows, the lower end 21 of the arm 20 comprises a tab 24 fixed as an extension of the arm and on which an electric motor 25 is fixed, for example a step motor, the horizontal shaft 26 of which extends through the tab 24.

It will be noted that the stitching device P may be directed in a vertical plane, by the action of the motor 25.

The stitching device P, mounted on the lower end 21 of the vertical arm 20, includes a support 27, fixed to the shaft 26, on which is fixed a rail 28, a block 29 sliding in the rail 28, a pneumatic jack 30, the cylinder of which is fixed on an extension 31 of the rail 28, joined to the latter and the piston rod 32 of which is connected to the block 29.

The block 29 carries a needle 33, described in detail in the abovementioned American patents.

The opposite end of the needle to its point 34 is fixed beside a pneumatic filament-gripper of known type 35 mounted on the block 29.

The filament-gripper 35 is connected by conduits 36 to a source of compressed air (not shown) and the fiber filament 4, originating from a source 37, supplies said needle 33.

A return spring 38 is provided between the block 29 and the rail 28, so that when the jack 30, supplied by a pipe 39, has pushed the block 29 into an extended position and is then set to release, the spring 38 pulls back the block 29 and the needle.

It will be noted that, by virtue of the motor M3 and/or the jack 30, is it possible to adjust the depth of penetration of the needle 33.

As is described in the two abovementioned American patents, when the needle 33 is inserted into the element 2, the filament 4 is carried along by said needle through said element 2 and possibly through the flange 3A of the element 3, the filament-gripper 35 being clamped and the travel of the needle being adjusted so as to penetrate into the foam block 23. As the needle 33 is withdrawn from the element 2, the filament-gripper is unclamped and the needle moves out while progressively releasing the filament 4 through the element 2 and possibly the flange 3A, thus forming an unclosed loop 4A which is only held back by the foam and by the friction in the element 2 or the elements 2 and 3.

Thus, it is by virtue of the elastic pressure of the foam closing up over the loop after the needle has been withdrawn on the one hand, and of the friction and clamping in the fibrous elements 2, 3 on the other hand, that when the needle has been withdrawn, the filament 4, which passes freely through the needle during this withdrawn, is held back in order to form the open loop 4A.

After it has been removed from the element 2 or the elements 2 and 3, the needle is moved up above the surface of said elements, by a distance equal to the thickness to be stitched plus the stitching pitch, that is to say the spacing desired between two stitches.

The filament-gripper 35 is then actuated to lock the filament in the needle, the arm 20 is moved by one pitch, and the device is once again actuated in order to restart the cycle so as to form continuously a large number of loops with the same filament 4, that is to say in order to form the stitches 4B of a row 5i.

Of course, by acting on the motor M2 at the end of a row 5i, it is possible to bring about a relative displacement of the needle 33 with respect to the reinforcement 1, in order to be able to carry out the next row of stitching 5j. In addition, by the action of the motor 18, it is possible to adjust the inclination of the needle 33 about the spindle 26 and therefore the inclination desired for the stitches 4B of each row 5i. It is therefore easy to obtain the stitching configurations depicted in FIGS. 1 to 3.

It will be noted that, if the element 2 were to have a complex shape, particularly one which cannot be laid flat, it might be necessary to mount the stitching device P at the end of an arm which can move with a very large number of degrees of freedom (for example 7) and possibly to replace the foam block 23 with a rotary template.

Figure 6:
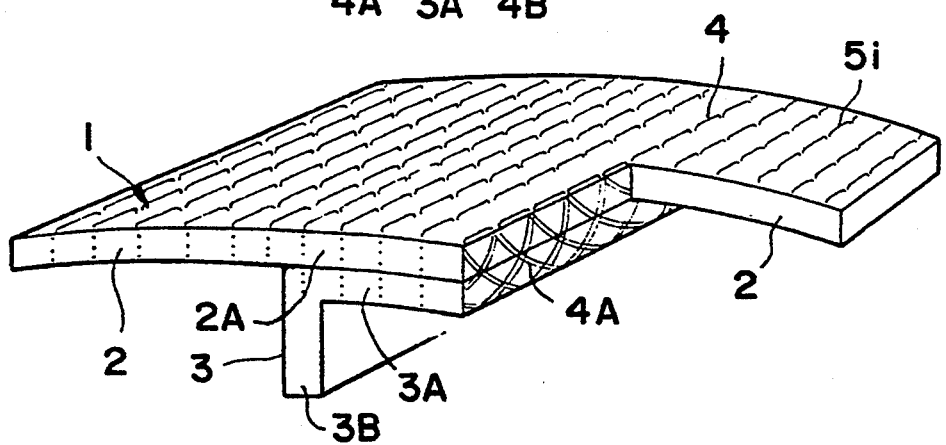
FIG. 6 depicts diagrammatically another variant of the reinforcement in accordance with the present invention.

In the embodiment of the reinforcement 1, shown in FIG. 6, the transverse fibers 4A are in the shape of portions of circles. Such a stitching configuration may be obtained by applying the method and device described in French Patent No. 2,658,841. In FIGS. 7 and 8, a curved stitching device P' has been represented, which is in accordance with this latter patent application and capable of being fixed, for example, to the lower end 21 of the vertical arm 20 of the machine 10 of FIG. 4, instead of the stitching device P of FIG. 5.

As can be seen in FIGS. 7 and 8, the needle 40 has a circular shape. It is hollow and has an internal channel passing through it, emerging through a lateral needle eye, adjacent to the point 41 of said needle and arranged in the concavity of the latter. The fiber 4 passes through the internal channel of the needle 40 and comes out through said lateral needle eye.

The opposite end of the needle 40 to the point 41 is fixed in a needle-holder 42 capable of moving in a to-and-fro motion rotationally about a spindle 43, passing through the center of the needle 40 and at least substantially perpendicular to the plane of the latter.

The needle-holder 42 is mounted so as to rotate on an arm 44, which furthermore carries a motor 45 for actuating the needle 40 rotationally about the spindle 43, a member 46 for actuating a loop-holding member 47, a member 48 for actuating a filament-grasping member 49 and a filament-gripper 50. The arm 44 is rigidly attached to a collar 51 for fixing onto the vertical arm 20. The various motors and members are connected to control devices (not shown) by a connector 52.

It is thus understood that, when the device P' is mounted on the machine 10 instead of the device P, it is possible to obtain, in the element 2 and possibly in the element 3, successive stitching lines 5i made up of curved stitches 4A, as is depicted in FIG. 6.

It is also understood that the various motors M1, M2, M3, 25 and the jack 30 may be controlled in a suitable manner in order to carry out all these operations by means of an electronic device with memory (not shown as it does not form part of the invention) which is previously programmed according to the shape of the reinforcement to be produced. In particular, this electronic device adjusts, by means of the motor M3 and/or the jack 30, the depth of penetration of the needles 33 and 40 in order to take account automatically of the differences in thickness due to the superposition of the elements 2 and 3.

The machine 10 of FIG. 4 is diagrammatic and the aim of its description is only to illustrate the present invention and it is of course possible, in order to implement the invention, to use more complex machines, like that for example described in the abovementioned French Patent No. 2,658,841.

After the reinforcements of FIGS. 1 to 3 and 6 have been obtained, the ordinary matrix impregnation and curing operations are carried out.

Figure 9:
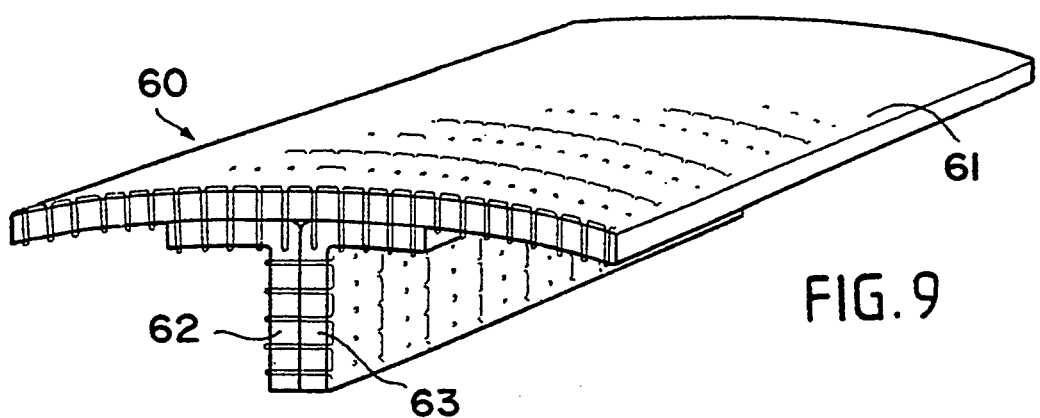
FIG. 9 shows diagrammatically in perspective a complex component in accordance with the present invention, comprising three distinct fibrous elements.

The component 60, in accordance with the present invention and shown in FIG. 9, comprises a curved plate 61, the concave face of which is reinforced by a double angle 62, 63 forming a T-shaped rib, said plate 61 and said angles 62, 63 consisting of a fibrous reinforcement embedded in a matrix.

Figure 10:
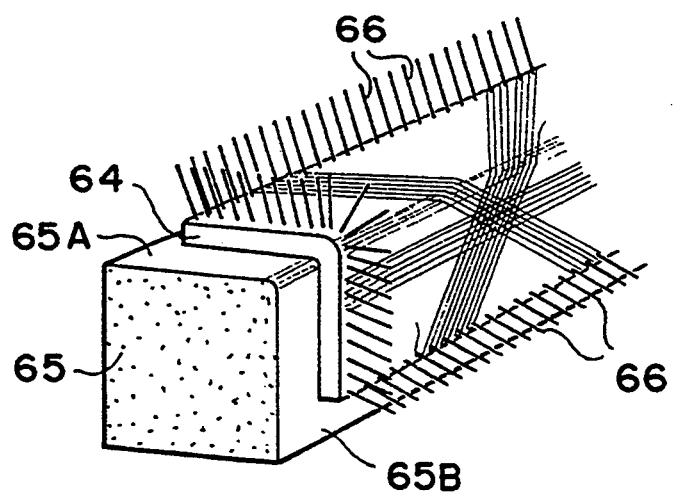
FIGS. 10 to 18 depict diagrammatically the production of the component of FIG. 9.
Figure 11:
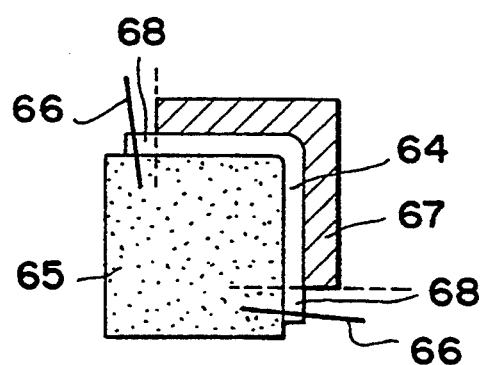
Figure 12:
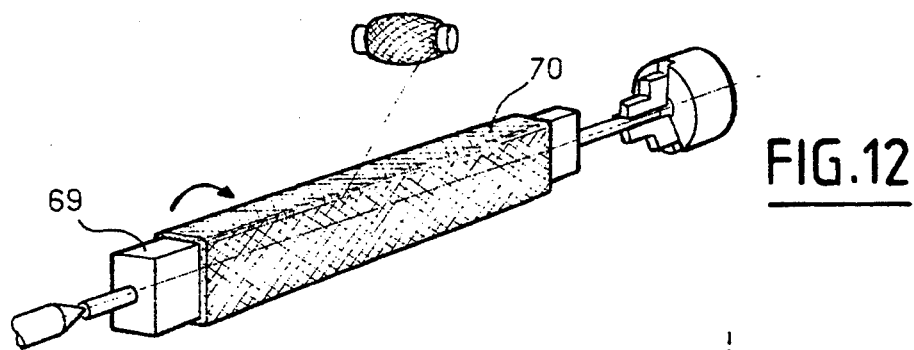
Figure 13:
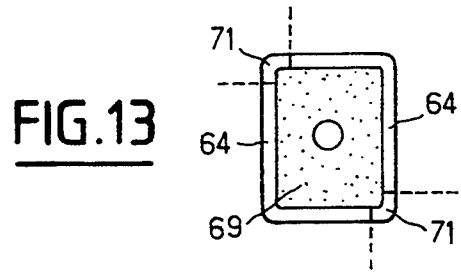

In order to produce a fibrous reinforcement element 64 for the angles 62 and 63, it is possible for example to operate as is depicted either in FIGS. 10 and 11 or in FIGS. 12 and 13.

According to the process depicted in FIGS. 10 and 11, on a foam block 65 comprising two orthogonal faces 65A and 65B, needles 66 are stuck in, making it possible to form an interlacement of fibers, by laying a continuous filament along several intersecting directions onto said faces 65A and 65B of the block 65. When this interlacement of fibers is sufficient to form a reinforcement element 64, a counter-form 67 is applied on top and the peripheral zones 68 are removed by cutting.

According to the process depicted in FIGS. 12 and 13, a winding of fibers 70 is formed on a rotary template 69 of rectangular cross section, and the angular parts 71 of this winding are removed by cutting. Two reinforcement elements 64 are then obtained simultaneously.

Whatever the process implemented, each reinforcement element 64 obtained comprises a bearing flange 64A, intended to be applied against the plate 61, and a stiffening flange 64B, intended to be joined together with the flange 64B of the other reinforcement element 64.

For this purpose, on the base 22 of the machine 10 equipped with the stitching device P (FIG. 4), there is arranged, instead of the foam block 23, a foam block 72 supporting the two reinforcement elements 64, so that their flanges 64B are applied against each other, the flanges 64A being opposite each other.

Figure 14:
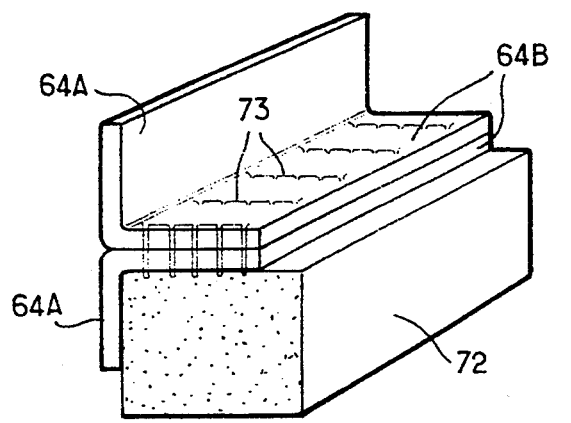
Figure 15:
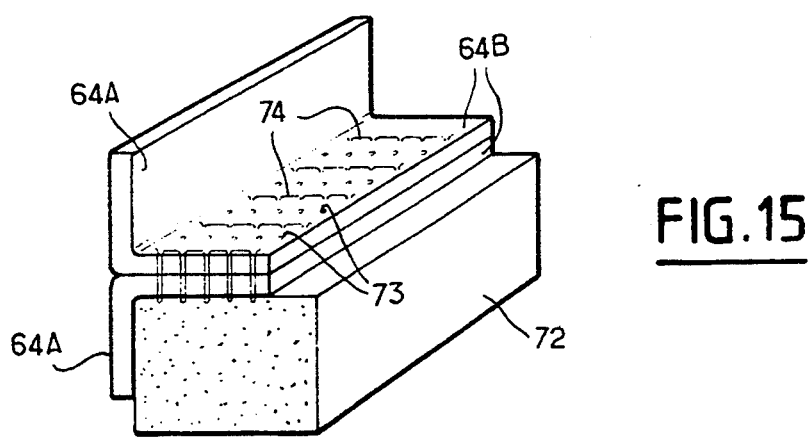

In the manner described above, starting from the external face of the flange 64B of a reinforcement element 64, the needle 33 supplied with filament 4 produces successive stitching lines 73, of the type depicted in FIG. 1 (FIG. 14). The two reinforcement elements 64 are then turned over on the template 72, so that, starting from the external face of the flange 64B of the other reinforcement element 64, the needle 33 produces similar successive stitching lines 74 (FIG. 15). Thus, the two reinforcement elements 64 are solidly attached to each other via their flanges 64B.

Figure 16:
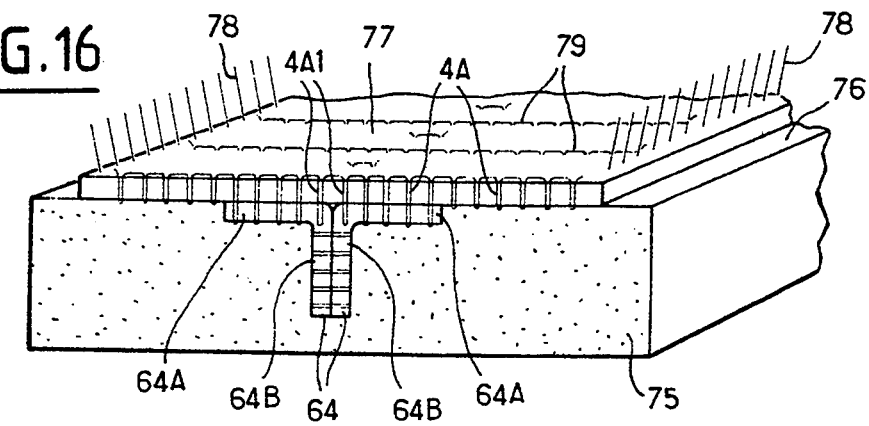

The foam block 72 is then replaced, on the base 22, by a new foam block 75 having a bearing face 76 and making it possible to arrange said reinforcement elements 64 so that the external face of their flanges 64A is flush with said bearing face 76. A reinforcement element 77 for the plate 61 is then arranged on this bearing face and is possibly held by needles 78. The needle 33, supplied with filament 4, then inserts, starting from the external face of the reinforcement element 77 which is on the opposite side to the elements 64, over the entire area of said reinforcement element 77, successive stitching lines 79, inserting transverse fibers 4A into the reinforcement element 77 and into the flanges 64A of the reinforcement elements 64 and joining said reinforcement elements 64 and 77 together (FIG. 16).

It will be noted that the stitching machine described with respect to FIGS. 4 and 5, which does not require a filament-knotting device on the side where the template 75 is located, makes it possible to insert such transverse fibers 4A1 even vertically in line with the flanges 64B.

Figure 17:
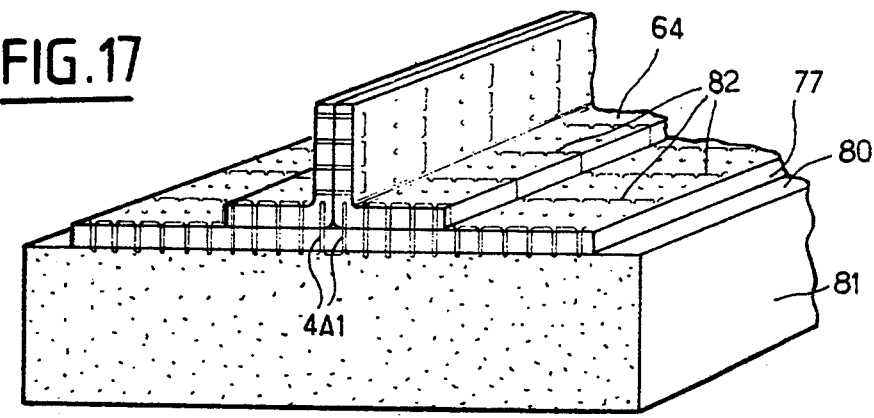

The reinforcement element assembly is then turned over and is applied, via the external face of the reinforcement element 77, against the bearing face 80 of a foam block 81, arranged on the base 22 of the machine 10, instead of the block 75. The needle 33 may then insert, through the internal faces of the reinforcement element 77 and of the flanges 64A of the reinforcement elements 64, other successive stitching lines 82 (FIG. 17).

At this stage of manufacture of the component 60, the reinforcement elements 64 and 77 may consist only of dry fibers, or their fibers may already be impregnated with a flexible binder, facilitating the handling of said reinforcement elements. This flexible binder may then be removed in any suitable manner. It may possibly be retained in order to contribute to the subsequent formation of the matrix.

Thus, the arrangement of the reinforcement elements 64 and 77, as it has just been obtained, whether it is impregnated with said flexible binder or not, must now be cured in order to form the component 60.

Figure 18:
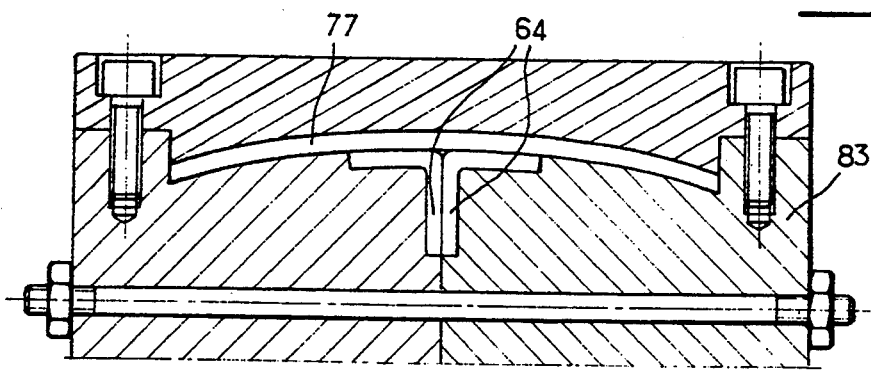

For this purpose, this arrangement of reinforcement elements 64 and 77, impregnated with the desired matrix material by any known technique, is inserted into a mold 83 where it is held in shape during the curing of the matrix material (FIG. 18). After this curing, said reinforcement arrangement forms the component 60.

I claim:

1. A method for producing a composite, comprising: (1) a fibrous panel having first and second major surfaces; and (2) a fibrous rib composed of at least one bearing flange and at least one stiffening flange orthogonal to one another wherein a bearing flange is applied against said first major surface and joined thereto by needle-stitching a continuous, unknotted filament into and over essentially the whole area of said second major surface, into said fibrous panel, through said first major surface and to and through said bearing flange.

2. A method for producing a composite, comprising: (1) a fibrous panel having first and second major surfaces; and (2) a fibrous rib composed of at least one bearing flange and at least one stiffening flange orthogonal to one another wherein a bearing flange is applied against said first major surface and joined thereto by needle-stitching a continuous, unknotted filament into and over essentially the whole area of said second major surface, into said fibrous panel, through said first major surface and to and through said bearing flange and to and into said stiffening flange.

3. The method of claim 2 wherein, additionally, stitches are inserted into said first major surface.

4. The method of claim 2 wherein, during the stitching operation, the travel of the needle is adjustably adapted throughout the entirety of the stitching process to the particular thickness of the fibrous materials being stitched.

5. The method of claim 2 wherein the stitches formed are inclined through the fabric thickness at an acute or obtuse angle to a plane definable by a line defined by stitch entry or exit points on a major surface of the fibrous panel.

6. The method of claim 5 wherein a specific angle of stitches is characteristic of a given row of stitches and varies systematically from acute to obtuse from one successive row to the next.

7. The method of claim 2 wherein the stitches formed are disposed through the fabric thickness normal to a plane defined by stitch entry or exit points on a major surface of the fibrous panel.

8. The method of claim 2 wherein the stitches formed are disposed through the fabric thickness in an arcuate configuration.

9. The method of claim 2 wherein the rib stitched to the panel is a single angle-shaped element.

10. The method of claim 2 wherein the rib stitched to the panel is composed of two angle-shaped elements prejoined to provide a T-shaped cross-section.

11. The method of claim 2 wherein the fibrous panel and the fibrous rib were impregnated with a flexible binder material prior to being stitched together.

12. The method of claim 11 wherein the binder is removed after stitching the fibrous panel and fibrous rib together.

13. A method of producing a fibrous composite-reinforced matrix comprising impregnating the composite produced by the method of claim 2 with a curable matrix material and, thereafter, curing the matrix material while the impregnated composite is configured in the desired configuration.

14. A method of producing a fibrous composite-reinforced matrix comprising impregnating the composite produced by the method of claim 11 with a curable matrix material and, thereafter, curing the matrix material while the impregnated composite is disposed in the desired configuration.

15. A method of producing a fibrous composite-reinforced matrix comprising impregnating the composite produced by the method of claim 12 with a curable matrix material and, thereafter, curing the matrix material while the impregnated composite is disposed in the desired configuration.

16. A composite produced by the method of claim 2.

17. A composite produced by the method of claim 11.

18. A fibrous composite-reinforced matrix produced by the method of claim 13.

19. A fibrous composite-reinforced matrix produced by the method of claim 14.

20. A fibrous composite-reinforced matrix produced by the method of claim 15.

* * * * *

UNITED STATES PATENT AND TRADEMARK OFFICE
CERTIFICATE OF CORRECTION

PATENT NO.   : 5,429,853
DATED        : Jul. 4, 1995
INVENTOR(S)  : Darrieux

It is certified that error appears in the above-identified patent and that said Letters Patent is hereby corrected as shown below:

On the title page, under

[73] Assignee: delete "Societe Nationale Industrielle et Aerospatiale" and insert --Aerospatiale Societe Nationale Industrielle--

Signed and Sealed this

Twenty-second Day of August, 1995

Attest:

BRUCE LEHMAN

*Attesting Officer*         *Commissioner of Patents and Trademarks*